Figure 1:
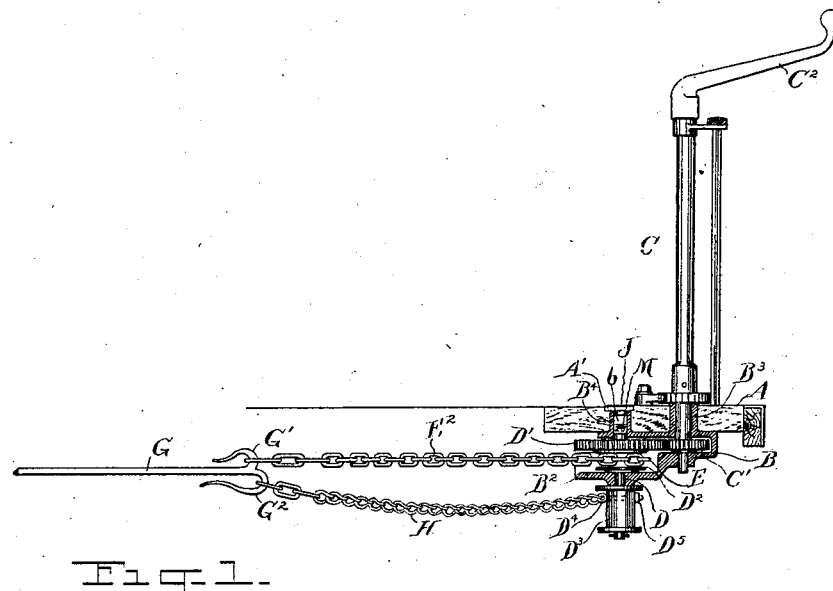

No. 722,989. PATENTED MAR. 17, 1903.
J. J. KENNELLY.
RAILROAD CAR BRAKE.
APPLICATION FILED JULY 12, 1902.
NO MODEL.

WITNESSES:
Marc A. Guigou.
J. B. Clautice

INVENTOR
John J. Kennelly
BY
Thomas Drew Stetson
ATTORNEY

UNITED STATES PATENT OFFICE.

JOHN J. KENNELLY, OF NEW YORK, N. Y.

RAILROAD-CAR BRAKE.

SPECIFICATION forming part of Letters Patent No. 722,989, dated March 17, 1903.

Application filed July 12, 1902. Serial No. 115,256. (No model.)

*To all whom it may concern:*

Be it known that I, JOHN J. KENNELLY, a citizen of the United States, residing in the borough of Manhattan, in the city and State of New York, have invented a certain new and useful Improvement in Railroad-Car Brakes, of which the following is a specification.

The improvement is intended more especially for trolley-cars, and I will describe it as thus applied.

The principal feature of the improvement relates to the provisions for safety in case a main chain should fail.

It is common to employ two chains so connected that when the brakes are let off both chains will be at rest, but both in position to instantly apply the brake, both nearly taut, the two chains being connected to the operating-wheel at opposite points. There is an advantage in this arrangement from the great promptness with which the brake commences to act so soon as the operator begins to turn the handle.

The great importance of reliable brakes makes it expedient to have a safety provision to serve in case the main operating-chain shall break. This has heretofore been successfully done by the cumbrous and expensive expedient of carrying another sprocket-wheel similar to the main one on an extension of the same upright shaft and employing two chains similar to the main chains, but conditioned so as in ordinary working to be slack. In brake mechanism thus equipped in case a main chain shall break such safety-chains are ready to serve, and on turning the shaft a little farther than before they serve with precisely the same effect as the main chains. I have discovered that very nearly the same effect can be obtained by one safety-chain, and thus reduce the weight and complication, and I have devised an improvement in the housing which by holding the chain ends out of contact still further reduces the liability to entanglement. I connect the one safety-chain to a cockeye, and while the main chains are intact my single safety-chain winds and unwinds in the same manner as a single main chain was formerly operated, but producing no effect, because my single safety-chain is of such length as to be always a little slack; but the moment the main chain breaks my single safety-chain instantly serves, and, as with the double chain, on turning the handle a little farther my single safety-chain is applied with the same effect as the double one which it displaces. The objection that during a few hours until the main chain can be repaired the brake is not applied with full effect when the handle commences to be turned, but only after the shaft has been partially turned, is valid; but it is not important. The rarity of the occasions when a main chain breaks and this safety-chain is called into use renders that objection insignificant.

With my improved construction, as shown, the drum which operates my single twisted chain lies entirely below the housing. The shaft may extend downward about the same as heretofore; but instead of a sprocket-wheel on the extension I use a simple flanged drum of a diameter a little less than the sprocket-wheel, and I make the single safety-chain of twisted links, so it is practically round and is certain to ride smoothly on the drum. The housing may extend down to the bottom and serve as a step for the lower end of the shaft below the flanged drum; but I prefer to terminate it immediately below the sprocket.

The following is a description of what I consider the best means of carrying out the invention.

The accompanying drawings form a part of this specification.

Figure 2:
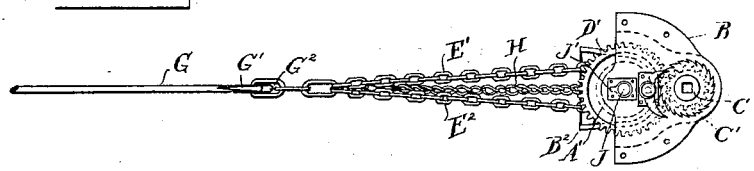
Figure 3:
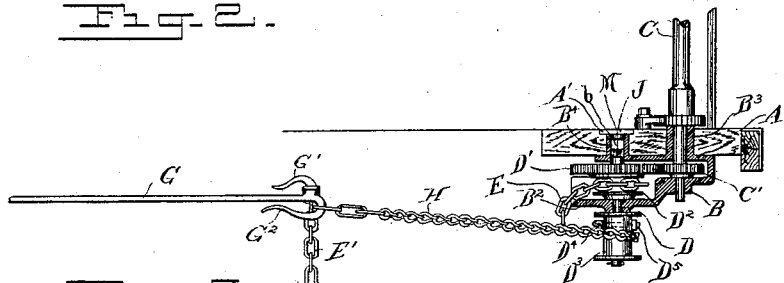
Figure 4:
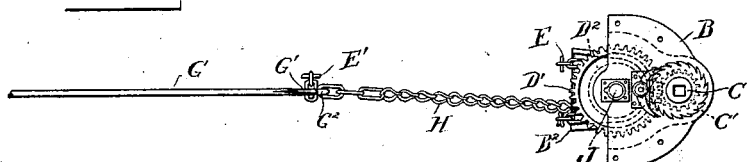

Figure 1 is a side elevation, partly in vertical section, showing the apparatus in its ordinary working condition, with the safety-chain idle and the main chain ready to instantly operate the brake so soon as the handle commences to be turned. Fig. 2 is a corresponding plan view. Fig. 3 is an elevation and section corresponding to Fig. 1, but showing the conditions which obtain when one of the main chains is broken and my single safety-chain is put into full action by sufficiently turning the drum. Only one of the main chains is shown in this figure. The unbroken main chain hanging idle is omitted for the sake of clearness. Fig. 4 is a corresponding plan view.

Similar letters of reference indicate corresponding parts in all the figures where they appear.

B is a housing, of cast-iron or other suitable material, certain portions being designated when necessary by supernumerals, as B'. It is firmly bolted below the flooring A of the car and is formed with two bosses $B^3$ and $B^4$, which are provided for by making corresponding holes in A and letting the bosses extend up therein.

C is the ordinary vertical shaft worked by the handle $C^2$ and engaging by the small pinion C' with a larger horizontal gear-wheel D' on the slower shaft D. Keyed or otherwise firmly set on the shaft D is a sprocket-wheel $D^2$. A chain E, composed of flat links, engages with this wheel, extending half around it, and its ends E' $E^2$, which may be referred to as two separate chains, because they serve as such, both connect with the hook G' on the bar G, so far as yet described corresponds with one of the previously well-known constructions of these parts.

Fast on the lower extension of the shaft D, below the bottom of the housing, is a flanged drum $D^3$, which carries a cockeye $D^4$, secured by a nut $D^5$. A single chain H, with twisted links, extends from this eye to the hook $G^2$ with a proper amount of slack.

In the use of the invention the brake is ordinarily applied and released in the usual manner by operating the handle $C^2$, and thereby partially turning the shaft D. The usual effect is produced on the chains E' $E^2$, and my single safety-chain is idly taken up and relaxed at each operation, but remains slack in all positions of the brake. When in any emergency one of the main chains E' $E^2$ breaks, the brake-rod G is held by the single safety-chain H nearly as forcibly as before. If it is desired to set it more tightly, it is only necessary, as with the previously-known constructions, to turn the handle $C^2$ farther, and thus to wind more of the single chain H on the drum.

I make the flanged drum $D^3$ of a little less diameter than the sprocket-wheel $D^2$, so that when the main chains are intact and working successfully the single safety-chain will be certain to remain slack, even if the lengths of the chain are imperfectly adjusted. The turning of the shaft D to any ordinary or extraordinary extent cannot tighten the safety-chain while the main chains E' $E^2$ are in service. I esteem the small diameter of the drum $D^3$ also an advantage in that it allows the brakes to be put on with a little superior force by the single safety-chain when the latter is at rare intervals required to serve.

Modifications may be made without departing from the principle or sacrificing the advantages of the invention.

Parts of the invention may be used without others. I can use the single safety-chain without the double-function bottom $B^2$ of the housing.

I claim as my invention—

1. As means for applying and releasing railroad-car brakes, the shaft D with means for turning and releasing it, a double chain E' $E^2$ engaging the brakes with such shaft for regular work, and a single safety-chain H engaging the brake more loosely with the same shaft, all substantially as herein specified.

2. As means for applying and releasing railroad-car brakes, the shaft D with means for turning and releasing it, a double chain E' $E^2$ engaging the brakes with such shaft for regular work by means of a sprocket-wheel $D^2$, and a single safety-chain H engaging the brake more loosely with the same shaft by means of a flanged drum $D^3$, all combined and arranged to serve substantially as herein specified.

3. As means for applying and releasing railroad-car brakes, the shaft D with means for turning and releasing it, a flat-link double chain E' $E^2$ engaging the brakes with such shaft for regular work by means of a sprocket-wheel $D^2$ and a twisted-link single safety-chain H engaging the brake more loosely with the same shaft by means of a flanged drum $D^3$, all combined and arranged to serve substantially as herein specified.

4. In railroad-car-brake mechanism, the handle $C^2$ with its standard C and pinion C', the large gear-wheel D' engaged therewith and the shaft D, sprocket $D^2$ and flanged drum $D^3$, the flat-link chains E' $E^2$ engaged with the sprocket, adjusted to perform the regular work, and the twisted-link chain H engaged with the drum to act as a reserve, both connecting to the brakes, and the housing B having the bosses $B^3$ and $B^4$ extending up through the car-floor A, and having the bottom $B^2$ performing the double function of a bearing for the shaft and a deflector for the said chains E' $E^2$, all arranged for joint operation substantially as specified.

In testimony that I claim the invention above set forth I affix my signature in presence of two witnesses.

JOHN J. KENNELLY.

Witnesses:
J. B. CLAUTICE,
M. F. BOYLE.